(12) United States Patent
Benco et al.

(10) Patent No.: US 8,200,268 B2
(45) Date of Patent: Jun. 12, 2012

(54) HOME INTERCOM / PUSH-TO-TALK INTERFACE

(75) Inventors: David S. Benco, Winfield, IL (US);
Kevin J. Overend, Elmhurst, IL (US);
Baoling S. Sheen, Naperville, IL (US);
Sandra L. True, St. Charles, IL (US);
Kenneth J. Voight, Sugar Grove, IL (US)

(73) Assignee: Alcatel Lucent, Paris (FR)

( * ) Notice: Subject to any disclaimer, the term of this patent is extended or adjusted under 35 U.S.C. 154(b) by 624 days.

(21) Appl. No.: 11/475,450

(22) Filed: Jun. 27, 2006

(65) Prior Publication Data

US 2007/0297588 A1 Dec. 27, 2007

(51) Int. Cl.
*H04Q 7/20* (2006.01)

(52) U.S. Cl. ........ 455/518; 455/519; 455/500; 455/517; 455/414.1; 455/426.1; 370/260; 370/259; 370/261; 370/310; 370/343

(58) Field of Classification Search .................. 455/518, 455/519, 500, 501, 550.1, 445, 569, 90.1, 455/90.2, 90.3, 575.1, 414.1, 414.2, 414.3, 455/426.1, 426.2, 416, 403, 422.1; 370/260, 370/259, 261, 343, 328, 329, 310
See application file for complete search history.

(56) References Cited

U.S. PATENT DOCUMENTS

| | | | |
|---|---|---|---|
| 2003/0013503 A1* | 1/2003 | Menard et al. | 455/569 |
| 2003/0207694 A1* | 11/2003 | Legare et al. | 455/511 |
| 2005/0117728 A1* | 6/2005 | Levine et al. | 379/167.01 |
| 2005/0143149 A1* | 6/2005 | Becker et al. | 455/575.1 |
| 2007/0150286 A1* | 6/2007 | Miller et al. | 704/270.1 |
| 2008/0155689 A1* | 6/2008 | Denninghoff et al. | 726/22 |

* cited by examiner

*Primary Examiner* — Keith Ferguson
(74) *Attorney, Agent, or Firm* — Carmen Patti Law Group, LLC

(57) ABSTRACT

An apparatus in one example has: an intercom system; a wireless push-to-talk system; and an integrated intercom/push-to-talk system operatively coupled to the intercom system and the wireless push-to-talk system, the integrated intercom/push-to-talk system functioning as a wireless terminal that communicates with the wireless push-to-talk system, and functioning as an intercom unit in the intercom system. Embodiments support an integration of, for example, a home intercom system with, for example, a commercially available wireless push-to-talk service.

9 Claims, 4 Drawing Sheets

HOME INTERCOM / PUSH-TO-TALK INTERFACE

TECHNICAL FIELD

The invention relates generally to telecommunication systems and, more specifically, to a system in which an intercom system is integrated with a wireless push-to-talk service.

BACKGROUND

Wireless communication systems are constantly evolving. System designers are continually developing greater numbers of features for both service providers as well as for the end users. In the area of wireless phone systems, cellular based phone systems have advanced tremendously in recent years. Wireless phone systems are available based on a variety of modulation techniques and are capable of using a number of allocated frequency bands. Available modulation schemes include analog FM and digital modulation schemes using Time Division Multiple Access (TDMA) or Code Division Multiple Access (CDMA). Each scheme has inherent advantages and disadvantages relating to system architecture, frequency reuse, and communications quality. However, the features the manufacturer offers to the service provider and which the service provider offers to the consumer are similar between the different wireless systems.

Other types of communication systems are known, for example, push-to-talk (abbreviated as PTT or P2T) is a two-way communication method that uses half-duplex mode where transmission occurs in both directions, but not at the same time. To use PTT, users must press a button on the PTT device while speaking, then release it when done. The listener must then do the same to respond. Common PTT devices include the walkie-talkie. Newer PTT systems use VoIP to provide digital PTT service over 3G data networks. PTT may be used in wired and wireless systems.

Although many users have access to both of these systems, the systems must be used separately. Also, the intercom type systems may only be used in a limited area.

Thus, there is a need in the art for a system that provides for an improved system in which an intercom system is integrated with a wireless push-to-talk service.

SUMMARY

One embodiment of the present method and apparatus encompasses an apparatus. This embodiment of the apparatus may comprise: an intercom system; a wireless push-to-talk system; and an integrated intercom/push-to-talk system operatively coupled to the intercom system and the wireless push-to-talk system, the integrated intercom/push-to-talk system functioning as a wireless terminal that communicates with the wireless push-to-talk system, and functioning as an intercom unit in the intercom system.

Another embodiment of the present method and apparatus encompasses a method. This embodiment of the method may comprise: interfacing an intercom system with a wireless push-to-talk system with an integrated intercom/push-to-talk system; using the integrated intercom/push-to-talk system as a wireless terminal that communicates with the wireless push-to-talk system; and using the integrated intercom/push-to-talk system as an intercom unit in the intercom system.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

In wireless cellular phone services, PTT is a means of instantaneous communication that uses a button to switch a device from voice transmission mode to voice reception mode. The operation of phones used in this way is similar to "walkie talkie" use. For cell phones that may operate both as a regular cell phone and a PTT phone, the PTT switches the phone from full duplex mode, where both parties can hear each other simultaneously, to half duplex mode, where only one party can speak at one time. Multiple parties to the conversation may also be included. For purely PTT phones, there's no switching from full duplex to have duplex mode.

Major wireless carriers typically have versions of the service, which has been in wide use, using the Integrated Digital Enhanced Network, or iDEN, in the telecommunications and construction industries for years. The new versions of PTT, sometimes described as "Push To Talk over Cellular" (PoC), are based on 2.5G or 3G packet-switched networks using a form of VoIP based upon SIP and RTP protocols instead of iDEN.

Embodiments of the present method and apparatus support an integration of, for example, a home intercom system with, for example, a commercially available wireless push-to-talk service. The embodiments according to the present method and apparatus may be utilized with a variety of different intercom systems and a variety of wireless communication systems. The intercom system may also be a wireless system.

Figure 1:
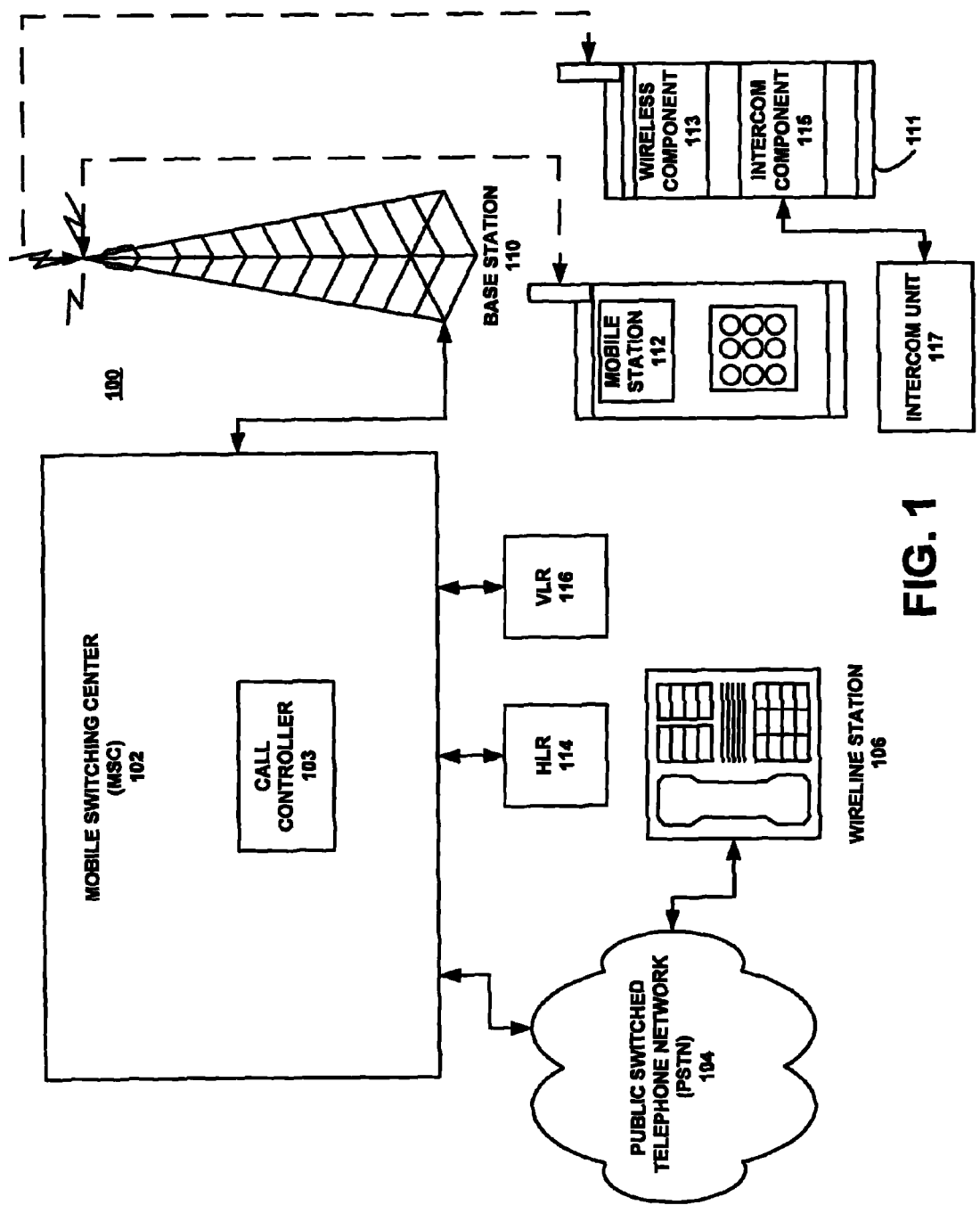
FIG. 1 depicts an embodiment of a wireless communication system operatively coupled to an intercom system.

FIG. 1 is a representation of one implementation of a system in which an intercom system is integrated with a wireless push-to-talk service.

Referring to FIG. 1, a network 100 is depicted for at least one mobile terminal 112 of a plurality of mobile terminals operatively connected to a communication network. Although the present system and method may be used with any type of network (wired and wireless, for example), the subscriber may typically be a mobile subscriber who uses a mobile terminal 112 (also referred to as mobile phone, a cell phone, mobile handset, or car phone). The network (or telecommunication network) 100 may have a mobile switching center (MSC) 102, which may have a call controller 103. The network 100 may be, or may be part of, one or more of a telephone network, a local area network ("LAN"), the Internet, and a wireless network. In the depicted embodiment, a public switched telephone network (PSTN) 104 is operatively coupled to the MSC 102. The PSTN 104 routes calls to and from mobile users through the MSC 102. The PSTN 104 also routes calls from and to wireline stations 106. The MSC 102 may also be connected to one or more base stations (BS) 110. Each of the base stations 110 communicates with mobile terminal(s) 112 in its service area. The PSTN 104 generally can be implemented as the worldwide voice telephone network accessible to all those with telephones and access privileges (e.g., AT&T long distance network).

The mobile terminal 112 may have a home location register (HLR) 114 where data about the mobile terminal 112 resides. If the mobile terminal 112 is remotely located from the home location, a visiting location register (VLR) 116 is set up locally for the mobile terminal 112 that is visiting in its service area. HLR 114 can be implemented as a permanent SS7 database utilized in cellular networks, such as, but not limited to, for example, AMPS (Advanced Mobile Phone System), and GSM (Global System for Mobile Communications).

HLR 114 may be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, may be implemented as a local database maintained by the cellular provider whose territory is being roamed. Mobile terminal 112 may be implemented as a cellular device, personal communication device, short message service device or wireless communications device (e.g., a wireless personal digital assistant). Preferably, the mobile terminal 112 is a push to talk mobile terminal.

The base station 110 may also be operatively coupled to an integrated intercom/push-to-talk system 111. The integrated intercom/push-to-talk system 111 may have a wireless component 113 and an intercom component 115. The intercom component 115 may be typically operatively coupled (such as wired) to other intercom units 117.

Figure 2:
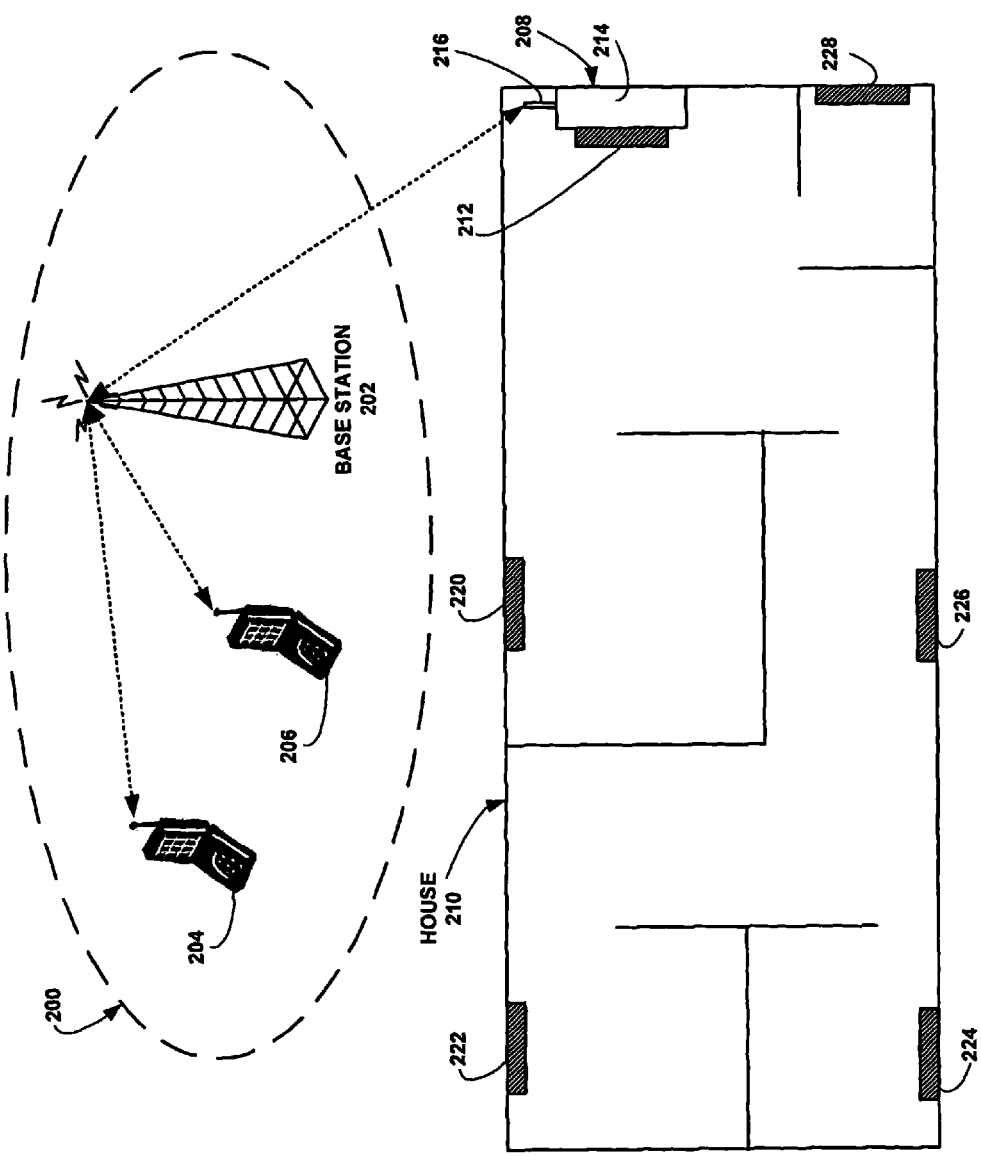
FIG. 2 depicts an embodiment of a system in which an intercom system is integrated with a wireless push-to-talk service.

FIG. 2 depicts an embodiment of a system in which an intercom system is integrated with a wireless push-to-talk service.

A communication network 200 may have a base station 202 wirelessly coupled to push to talk mobile terminals 204 and 206. The base station 202 may also be wirelessly coupled, via an antenna 216, to an integrated intercom/push-to-talk system 208 in a house 210. The antenna 216 may be operatively coupled to a wireless component 214 that is interfaced with an intercom component 212. The intercom component 212 may be wired to intercom units 220, 222, 224, 226 and 228.

Many homes today have integrated intercom systems to allow family members to easily communicate across rooms in the house. With these systems, most rooms in the house have an intercom unit, making all family members in the house readily reachable from within the house. By having the home intercom system also function as a terminal in a wireless push-to-talk system, it also enables a family member who is not in the house to easily reach any and all family members who are currently at home. For example, the system may allow a parent outside of the house to efficiently pass along information to all people in the house; such as informing them that they'll be late, reminding them to take the dog for a walk, or to start something for dinner. Likewise, any child in the house may contact an out-of-the-house parent on their wireless push-to-talk phone from the integrated home system.

In embodiments according to the present method and apparatus, the integrated intercom/push-to-talk system may act like an ordinary in-home intercom for internal communication. The push-to-talk portion of the integrated system may act like a stationary terminal in a commercial push-to-talk service. In these embodiments only one of the home intercom terminals may possess the wireless push-to-talk capability. This terminal may thus contain both the intercom and push-to-talk functionality. That is, this terminal may serve as an intercom terminal and also handle the external push-to-talk function for the entire house, i.e. the external wireless transmit and receive operations. In some locations, it may be necessary to provision the home push-to-talk terminal with an external antenna, depending on the RF coverage where the house is located.

The integrated intercom/push-to-talk system may have a special identifier to indicate to the wireless network and push-to-talk subscribers that it is a home terminal.

Incoming push-to-talk calls may, for example, be played on all intercoms in the house so that all those at home would hear the message regardless of where in the house they were located. Outgoing push-to-talk calls from the home system may be made from any terminal in the house, with the wireless-enabled terminal handling the transmission for all the others.

Again referring to FIG. 2 the push to talk mobile terminal 204, for example, may call the wireless terminal 208, and the call may be connected to each of the intercom units 212, 220, 222, 224, 226, 228. A user may communicate with the push to talk mobile terminal 204 using push to talk from any one of the intercom units 212, 220, 222, 224, 226, 228.

Figure 3:
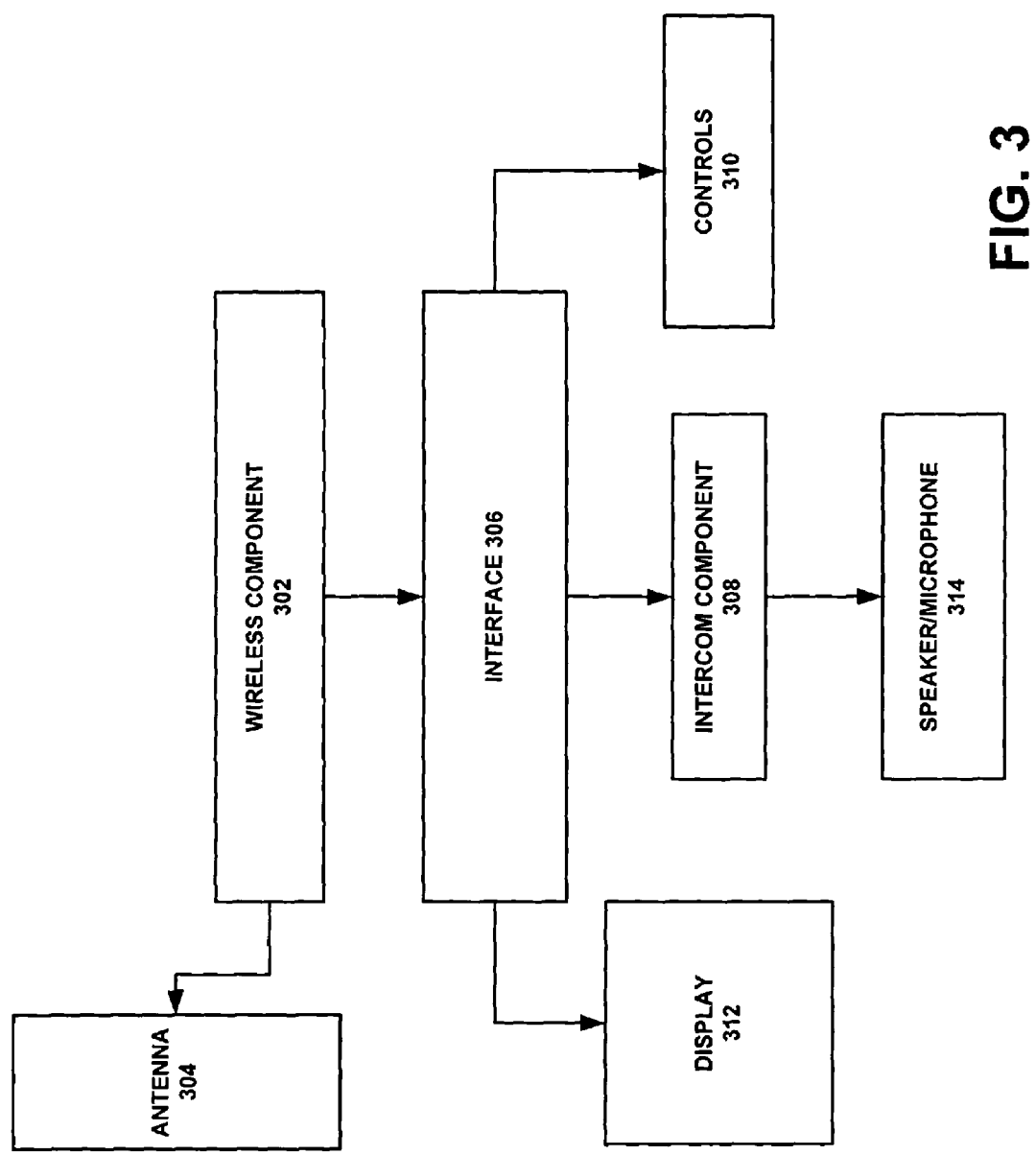
FIG. 3 depicts an embodiment of an intercom and push to talk system.

FIG. 3 depicts a more detailed embodiment of an intercom and push to talk system. The wireless component 302 may be operatively coupled to an antenna 304. An interface 306 may couple the wireless component 302 to an intercom component 308. The interface 306 is capable of transferring audio information and control information between the wireless component 302 to the intercom component 308. The interface 306 may further be operatively coupled to user controls 310 and a display 312. The intercom component 308 may have a speaker/microphone 314.

A simple analog voice interface may be used between the wireless component of terminal and the intercom component of intercom terminal 212. As with any PTT device, the wireless component needs to be decoded from the air interface technology to an audible analog signal that is amplified and played over the unit's speaker for the called party to hear. This same audible analog signal is passed directly to the speaker on terminal 212 and also sent to the other intercom units in the house.

The same interface applies for an outgoing PTT call. The audible analog speech signal is passed to terminal 212, where it is amplified and played over the unit's speaker. This same analog speech signal is input directly to the wireless component of terminal 212, where it is encoded into the appropriate air interface technology before being transmitted to the base station 202.

Figure 4:
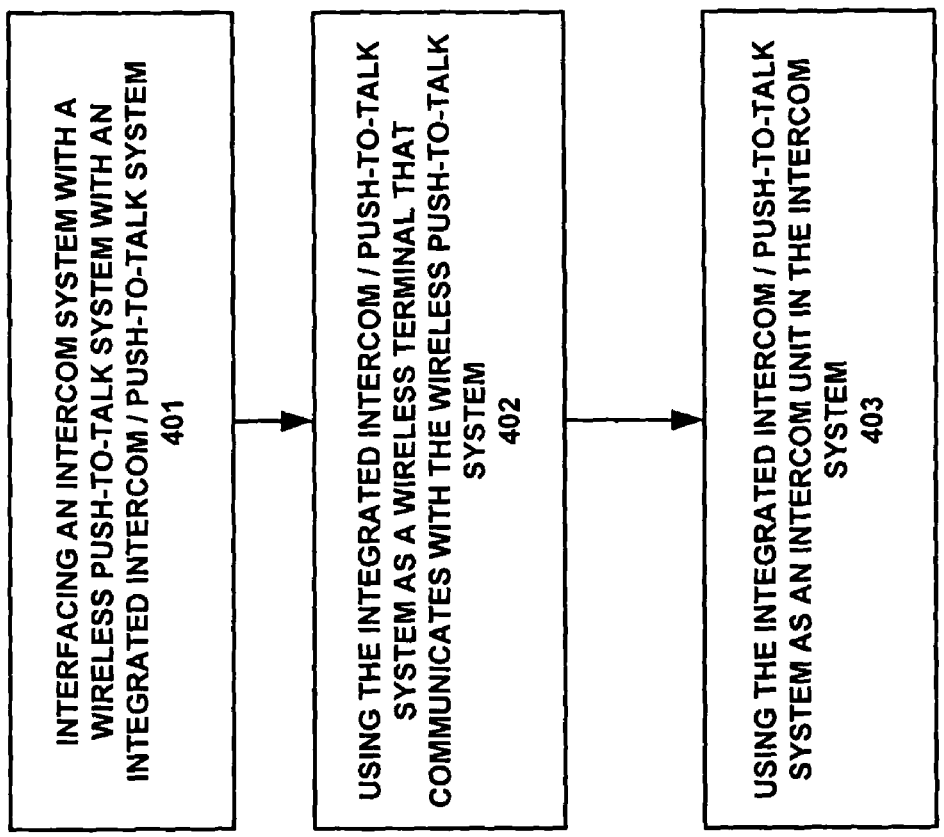
FIG. 4 is a representation of a flow diagram according to the present method for integrating an intercom system with a wireless push-to-talk service.

FIG. 4 is a representation of a flow diagram according to the present method for integrating an intercom system with a wireless push-to-talk service. One embodiment of the present method may have the steps of: interfacing an intercom system with a wireless push-to-talk system with an integrated intercom/push-to-talk system (401); using the integrated intercom/push-to-talk system as a wireless terminal that communicates with the wireless push-to-talk system (402); and using the integrated intercom/push-to-talk system as an intercom unit in the intercom system (403).

The present apparatus in one example may comprise a plurality of components such as one or more of electronic components, hardware components, and computer software components. A number of such components may be combined or divided in the apparatus.

The present apparatus may employ at least one computer-readable signal-bearing media that may store software, firmware and/or assembly language, etc. The computer-readable signal-bearing medium may comprise magnetic, electrical, optical, biological, and/or atomic data storage mediums. For example, the computer-readable signal-bearing medium may comprise floppy disks, magnetic tapes, CD-ROMs, DVD-ROMs, hard disk drives, and electronic memories, etc. The computer-readable signal-bearing medium may also comprise a modulated carrier signal transmitted over a network comprising or coupled with the apparatus, for instance, at least one of a telephone network, a local area network ("LAN"), a wide area network ("WAN"), the Internet, and a wireless network.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

We claim:

1. An apparatus, comprising:
   an intercom system;
   a wireless push-to-talk cellular terminal; and
   an integrated intercom/push-to-talk system operatively coupled to the intercom system and to the wireless push-to-talk cellular terminal, the integrated intercom/push-to-talk system functioning as a wireless terminal that communicates with the wireless push-to-talk cellular terminal, and functioning as an intercom unit in the intercom system, wherein the intercom system has a plurality of intercom units, and wherein push-to-talk communication is facilitated between any of the plurality of intercom units and the wireless push-to-talk cellular terminal, and
   wherein the intercom system has a plurality of intercom units, the integrated intercom/push-to-talk system functioning as one of the intercom units, wherein the wireless push-to-talk cellular terminal includes a plurality of push-to-talk cellular terminals, the integrated intercom/push-to-talk system functioning in push-to-talk communication with at least one of the push-to-talk cellular terminals, and wherein the push-to-talk cellular terminals has a predetermined identifier that indicates to other push-to-talk cellular terminals that the integrated intercom/push-to-talk system is coupled to intercom units, wherein incoming push-to-talk calls to the intercom system are simultaneously played on all of the intercom units of the intercom system so that all would hear the call.

2. The apparatus according to claim 1, wherein the wireless push-to-talk cellular terminal includes a plurality of push-to-talk cellular terminals, the integrated intercom/push-to-talk system functioning in push-to-talk communication with at least one of the push-to-talk cellular terminals.

3. The apparatus according to claim 1, wherein outgoing push-to-talk calls from the intercom system are placeable from any one of the intercom units of the intercom system.

4. An apparatus for facilitating push to talk communication between an intercom system and a wireless push-to-talk cellular terminal, comprising:
   an integrated intercom/push-to-talk system operatively coupled to the intercom system and to the wireless push-to-talk cellular terminal, the integrated intercom/push-to-talk system functioning as a wireless terminal that communicates via push-to-talk with the wireless push-to-talk cellular terminal, and functioning as an intercom unit in the intercom system; and
   the integrated intercom/push-to-talk system having a wireless push-to-talk component, which is the wireless terminal, and an intercom component, which is the intercom unit, and a push-to-talk interface that is operatively coupled to the wireless push-to-talk component and the intercom component, the interface transferring at least push-to-talk calls between the wireless push-to-talk component and the intercom component,
   wherein the intercom system has a plurality of intercom units, the integrated intercom/push-to-talk system functioning as one of the intercom units, wherein the wireless push-to-talk cellular terminal includes a plurality of push-to-talk cellular terminals, the integrated intercom/push-to-talk system functioning in communication with at least one of the push-to-talk cellular terminals, and wherein the push-to-talk cellular terminals has a predetermined identifier that indicates to other push-to-talk cellular terminals that the integrated intercom/push-to-talk system is coupled to intercom units, and wherein incoming push-to-talk calls to the intercom system are simultaneously played on all of the intercom units so that all would hear the call.

5. The apparatus according to claim 4, wherein the intercom system has a plurality of intercom units, the integrated intercom/push-to-talk system functioning as one of the intercom units.

6. The apparatus according to claim 4, wherein the wireless push-to-talk cellular terminal has a plurality of push-to-talk cellular terminals, the integrated intercom/push-to-talk system functioning in push-to-talk communication with at least one of the push-to-talk cellular terminals.

7. The apparatus according to claim 4, wherein outgoing push-to-talk calls from the intercom system are placeable from any one of the intercom units.

8. The apparatus according to claim 4, wherein the interface has a display operatively coupled thereto.

9. The apparatus according to claim 4, wherein the interface has user controls operatively coupled thereto.

* * * * *